US006099944A

United States Patent [19]

Laprade et al.

[11] Patent Number: 6,099,944

[45] Date of Patent: Aug. 8, 2000

[54] HEAT-TRANSFER LABEL INCLUDING A FROSTED INK DESIGN

[75] Inventors: Jean Paul Laprade, North Smithfield, R.I.; Friedrich H. H. Geurtsen, Holliston; Mukund Patel, Marlboro, both of Mass.

[73] Assignee: Avery Dennison Corporation, Pasadena, Calif.

[21] Appl. No.: 09/204,424

[22] Filed: Dec. 3, 1998

Related U.S. Application Data

[63] Continuation-in-part of application No. 09/204,339, Dec. 2, 1998, abandoned.

[51] Int. Cl.[7] .......... B32B 3/00

[52] U.S. Cl. .......... 428/195; 428/328; 428/331; 428/343; 428/355 R; 428/500; 428/914

[58] Field of Search .......... 428/202, 195, 428/349, 352, 524, 913, 914, 28, 331, 343, 500

[56] References Cited

U.S. PATENT DOCUMENTS

| | | | |
|---|---|---|---|
| 5,256,492 | 10/1993 | Hirota et al. | 428/524 |
| 5,475,050 | 12/1995 | Kawano et al. | 524/493 |
| 5,723,405 | 3/1998 | Hastreiter, Jr. et al. | 503/227 |

OTHER PUBLICATIONS

Technical literature for UCAR Phenoxy Resin PKHH, Phenoxy Associates, Rock Hill, SC, publicly available before filing of present appln.

Technical literature for PHPHEN PKHW–34, InChem Corp., South Carolina, publicly available before filing of present application.

*Primary Examiner*—Bruce Hess
*Assistant Examiner*—Michael E. Grendzynski
*Attorney, Agent, or Firm*—Kriegsman & Kriegsman

[57] ABSTRACT

A heat-transfer label that may be used, for example, to decorate clear glass articles in such a way as to give such articles the appearance of having been frosted. In a preferred embodiment, the label includes (a) a support portion in the form of a sheet of paper overcoated with a release layer of polyethylene, (b) a skim coat of wax overcoated onto the polyethylene release layer and (c) a transfer portion, the transfer portion including a protective lacquer layer printed onto the skim coat, an ink layer printed onto the protective lacquer layer, and an adhesive layer printed onto the ink layer, as well as onto any exposed portions of the underlying protective lacquer layer and onto a surrounding area of the skim coat. The protective lacquer layer comprises a solvent-soluble phenoxy resin that has been cross-linked by a melamine resin. The ink layer comprises a design printed with a frosted ink, the frosted ink preferably comprising a solvent-soluble phenoxy resin, a silica and a colorant. The adhesive layer comprises a phenoxy resin of the type present in a water-based phenoxy resin dispersion.

18 Claims, 1 Drawing Sheet

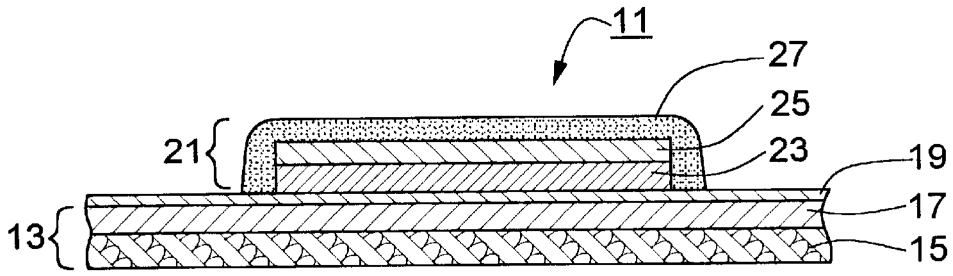
*FIG. 1*
*FIG. 2*
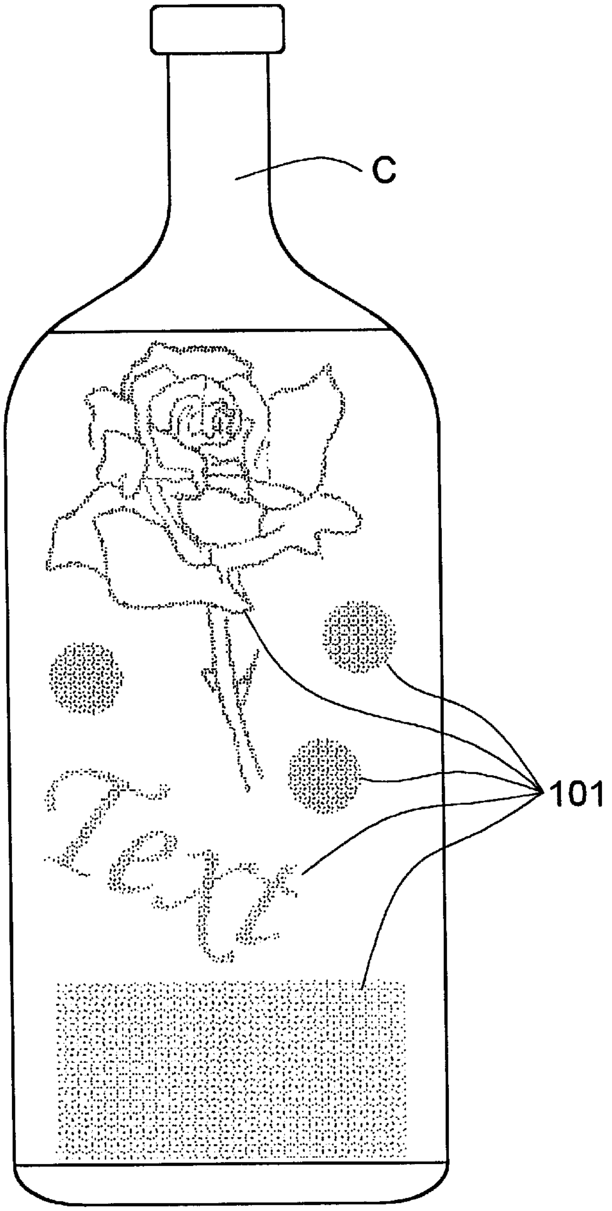

HEAT-TRANSFER LABEL INCLUDING A FROSTED INK DESIGN

CROSS-REFERENCE TO RELATED APPLICATIONS

The present application is a continuation-in-part of U.S. patent application Ser. No. 09/204,339, filed Dec. 2, 1998 now abandoned.

BACKGROUND OF THE INVENTION

The present invention relates generally to heat-transfer labels and more particularly to a heat-transfer label including a design printed with an ink having a frosted appearance.

Heat-transfer labels are commonly used in the decorating and/or labelling of commercial articles, such as, and without limitation to, containers for beverages (including alcoholic beverages, such as beer), essential oils, detergents, adverse chemicals, as well as health and beauty aids. As can readily be appreciated, heat-transfer labels are desirably resistant to abrasion and chemical effects in order to avoid a loss of label information and desirably possess good adhesion to the articles to which they are affixed.

One of the earliest types of heat-transfer label is described in U.S. Pat. No. 3,616,015, inventor Kingston, which issued October, 1971, and which is incorporated herein by reference. In the aforementioned patent, there is disclosed a heat-transfer label comprising a paper sheet or web, a wax release layer affixed to the paper sheet, and an ink design layer printed on the wax release layer. In the heat-transfer labelling process, the label-carrying web is subjected to heat, and the label is pressed onto an article with the ink design layer making direct contact with the article. As the paper sheet is subjected to heat, the wax layer begins to melt so that the paper sheet can be released from the ink design layer, a portion of the wax layer being transferred with the ink design layer and a portion of the wax layer remaining with the paper sheet. After transfer of the design to the article, the paper sheet is immediately removed, leaving the design firmly affixed to the article and the wax transferred therewith exposed to the environment. The wax layer is thus intended to serve two purposes: (1) to provide release of the ink design from the web upon application of heat to the web and (2) to form a protective layer over the transferred ink design. After transfer of the label to the article, the transferred wax release layer is typically subjected to a post-flaming technique which enhances the optical clarity of the wax protective layer (thereby enabling the ink design layer therebeneath to be better observed) and which enhances the protective properties of the transferred wax release.

Many heat-transfer labels include, in addition to the layers described above, an adhesive layer (comprising, for example, a polyamide or polyester adhesive) deposited over the ink design to facilitate adhesion of the label onto a receiving article. An example of a heat-transfer label having an adhesive layer is disclosed in U.S. Pat. No. 4,548,857, inventor Galante, which issued Oct. 22, 1985, and which is incorporated herein by reference. Additionally, many heat-transfer labels additionally include a protective lacquer layer interposed between the wax release layer and the ink layer. An example of such a label is disclosed in U.S. Pat. No. 4,426,422, inventor Daniels, which issued Jan. 17, 1984, and which is incorporated herein by reference.

One phenomenon that has been noted with heat-transfer labels of the type described above containing a wax release layer is that, quite often, a degree of hazing or a "halo" is noticeable over the transferred label when the transfer is made onto clear materials. This "halo" effect, which persists despite post-flaming and which may detract from the appearance of the label, is caused by the wax coating around the outer borders of the transferred ink design layer. Hazing due to the wax release layer may also appear in "open-copy" areas of the label, i.e., areas of the label where no ink is present between the adhesive and protective lacquer layers, and also may detract from the appearance of the label.

In addition to and related to the aforementioned problem of hazing, when heat-transfer labels of the type described above are applied to dark-colored containers, the outer wax layer of the label often appears as a whitish coating on the container, which effect is undesirable in many instances. Furthermore, scratches and similar abrasions to the outer wax layer of the label can occur easily and are readily detectable.

Accordingly, to address the aforementioned issues, considerable effort has been expended in replacing or obviating the need for a wax release layer. One such wax-less, heat-transfer label is disclosed in U.S. Pat. No. 3,922,435, inventor Asnes, which issued Nov. 25, 1975, and which is incorporated herein by reference. In the aforementioned patent, the layer of wax is replaced with a layer of a non-wax resin. This non-wax resinous layer is referred to in the patent as a dry release since it does not transfer to the article along with the ink design layer. In a preferred embodiment of the patent, the non-wax resinous layer comprises a thermoset polymeric resin, such as cross-linked resins selected from the group consisting of acrylic resins, polyamide resins, polyester resins, vinyl resins and epoxy resins.

Another example of a wax-less, heat-transfer label is disclosed in U.S. Pat. No. 4,935,300, inventors Parker et al., which issued Jun. 19, 1990, and which is incorporated herein by reference. In the aforementioned patent, the label, which is said to be particularly well-suited for use on high density polyethylene, polypropylene, polystyrene, polyvinylchloride and polyethylene terephthalate surfaces or containers, comprises a paper carrier web which is overcoated with a layer of polyethylene. A protective lacquer layer comprising a polyester resin and a relatively small amount of a non-drying oil is printed onto the polyethylene layer. An ink design layer comprising a resinous binder base selected from the group consisting of polyvinylchloride, acrylics, polyamides and nitrocellulose is then printed onto the protective lacquer layer. A heat-activatable adhesive layer comprising a thermoplastic polyamide adhesive is then printed onto the ink design layer.

Although the above-described wax-less, heat-transfer label substantially reduces the wax-related effects discussed previously, said label does not quite possess the same release characteristics of heat-transfer labels containing a wax release layer. Accordingly, another type of heat-transfer label differs from the heat-transfer label disclosed in U.S. Pat. No. 4,935,300, only in that a very thin layer or "skim coat" of a waxlike material is interposed between the polyethylene release layer and the protective lacquer layer to improve the release of the protective lacquer from the polyethylene-coated carrier web. The thickness of the skim coat corresponds to approximately 0.1–0.4 lbs. of the waxlike material spread onto about 3000 square feet of the polyethylene release layer.

In U.S. Pat. No. 5,800,656, inventors Geurtsen et al., which issued Sep. 1, 1998, and which is incorporated herein by reference, there is disclosed an example of the aforementioned type of heat-transfer label. According to one embodiment, the label is designed for use on silane-treated glass containers of the type that are subjected to pasteurization conditions, the label including a support portion, a skim coat positioned on top of the support portion and a transfer portion positioned on top of the support portion. The support portion includes a sheet of paper overcoated with a release layer of polyethylene. The transfer portion includes an organic solvent-soluble phenoxy resin protective lacquer layer, an organic solvent-soluble polyester resin ink layer over the protective lacquer layer, and a water-dispersible acrylic adhesive resin layer over the ink layer.

Another example of a heat-transfer label is disclosed in presently-pending U.S. patent application Ser. No. 09/189,277, which application is incorporated herein by reference. According to one embodiment, the label is particularly well-suited for use in decorating silane-treated glass articles of the type subjected to pasteurization conditions and includes (a) a support portion in the form of a sheet of paper overcoated with a release layer of polyethylene, (b) a skim coat of wax overcoated onto the polyethylene release layer and (c) a transfer portion, the transfer portion including a cross-linked phenoxy protective lacquer layer printed onto the skim coat, a polyester ink layer printed onto the protective lacquer layer, and an adhesive layer printed onto the ink layer, as well as onto any exposed portions of the underlying protective lacquer layer and onto a surrounding area of the skim coat. The cross-linked phenoxy resin comprises a solvent-soluble phenoxy resin of the formula

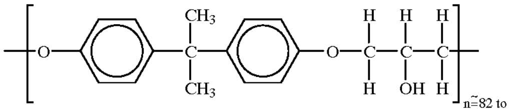

n≅82 to 123 wherein said solvent-soluble phenoxy resin is cross-linked by a partially methylated melamine formaldehyde resin. The adhesive layer comprises a phenoxy resin of the type present in a water-based phenoxy resin dispersion. The adhesive layer is preferably made by gravure printing onto its underlying layers an adhesive composition comprising the water-based phenoxy resin dispersion, isopropyl alcohol and water, and then evaporating the volatile components of the composition to leave an adhesive phenoxy film.

Largely for aesthetic reasons, it has become increasingly more common in the bottling of wines and the like to use a glass bottle having a frosted, opaque or hazy appearance—as compared to a clear or transparent appearance. Typically, such glass bottles are given a frosted appearance by a chemical etching process (typically by exposing the glass bottles to a strong acid) or by a mechanical abrading process (e.g., by sandblasting the glass bottles). One problem that has been encountered in labelling such frosted glass bottles is that the application of a label to the bottle tends to negate the frosted effect of the bottle in those areas in which the label covers the bottle, thereby causing any open-copy areas of the label to appear clear, instead of frosted. As can readily be appreciated, such a result is undesirable from an aesthetic viewpoint. Consequently, various approaches have been taken to make the bottle appear frosted in the open-copy areas. One such approach has been to use a pressure-sensitive label in which a layer of frosted material is interposed between the ink design layer and the pressure-sensitive adhesive layer. Although this approach substantially ameliorates the aforementioned loss of the frosted effect caused by labelling, the use of a pressure-sensitive label of the foregoing type introduces other aesthetic shortcomings typically associated with pressure-sensitive labels in general.

Accordingly, another such approach has been to use a heat-transfer label of the type comprising a support portion, a skim coat positioned on top of the support portion, and a transfer portion positioned on top of the skim coat, the transfer portion comprising a cross-linked phenoxy protective lacquer printed on the skim coat, a polyester ink printed on the protective lacquer layer and an adhesive layer comprising a mixture of polyester resins and a silica (SILCRON G-131 fine particle silica, Millennium Specialty Chemicals, Baltimore, Md.), said adhesive layer being printed onto the ink layer, as well as onto any exposed portions of the underlying protective lacquer layer and onto a surrounding area of the skim coat. The above-described heat-transfer label approach has been found to work well in overcoming the loss of the frosted effect in open-copy areas.

Quite apart from the above-discussed issue of frosted effect loss, the use of frosted glass bottles, while aesthetically pleasing, does have certain problems associated therewith. One such problem is that the chemical or mechanical processes needed to give the glass bottles their frosted look can be expensive. Moreover, if the bottle manufacturer is not capable of performing the frosting procedure itself, the bottles must be shipped to a processing specialist for such processing, thereby delaying the filling of such bottles and increasing manufacturing costs. Another problem is that the processes used to frost the bottles tend to weaken the bottles, making the bottles more susceptible to breakage.

SUMMARY OF THE INVENTION

In view of the above, the present inventors have recognized that there is a need for a technique for endowing an article, such as a clear glass container, with a frosted appearance without besetting the article with some of the shortcomings associated with conventional frosting techniques.

Therefore, according to one aspect of the present invention, there is provided a heat-transfer label that may be used, for example, to decorate clear glass articles in such a way as to give such articles the appearance of having been frosted, said heat-transfer label comprising (a) a support portion and (b) a transfer portion over said support portion for transfer of the transfer portion from the support portion to an article upon application of heat to the support portion while the transfer portion is placed into contact with the article, said transfer portion comprising (i) an ink layer, said ink layer including a design printed with a frosted ink; and (ii) an adhesive layer over said ink layer.

In a preferred embodiment, the frosted ink used to print the design of the ink layer comprises a phenoxy resin, a silica and a colorant. Said phenoxy resin is preferably a solvent-soluble phenoxy resin of the type commercially available as PKHH phenoxy resin (Phenoxy Associates, Rock Hill, S.C.). Said silica is preferably an aerogel-type synthetic fine particle silica of the type commercially available as SiLCRON G131 fine particle silica (Millennium Specialty Chemicals, Baltimore, Md.). Said colorant may be, for example, titanium dioxide to give the frosted design a whitish hue or another type of colorant to endow the frosted design with another color. Said frosted ink preferably comprises about 20%, by weight, of said phenoxy resin, about 7–10%, by weight, of said silica and about 5–10%, by weight, of said colorant for a total non-volatile solids content of about 35%, the remainder of said frosted ink constituting a 2:1 mixture of methyl ethyl ketone and toluene.

In addition, said adhesive layer preferably comprises a phenoxy resin of the type present in a water-based phenoxy resin dispersion (e.g., PAPHEN® PKHW-34, InChem Corp.), said adhesive layer preferably being made by gravure printing onto its underlying layers a composition comprising said water-based phenoxy resin dispersion, isopropyl alcohol and water, and then evaporating the volatile components of the composition to leave a phenoxy film.

Said transfer portion preferably further includes a protective lacquer layer, said ink layer being positioned over said protective lacquer layer. Said protective lacquer layer preferably comprises a cross-linked phenoxy resin. Said cross-linked phenoxy resin is preferably made by cross-linking a solvent-soluble phenoxy resin of the following chemical formula:

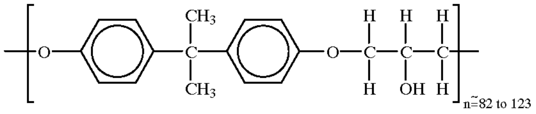

with a melamine formaldehyde resin. The aforementioned heat-transfer label preferably further comprises a waxlike skim coat, said waxlike skim coat being interposed between said support portion and said transfer portion, wherein said transfer portion preferably comprises polyethylene-coated paper.

The aforementioned label is particularly well-suited for use in decorating silane-treated, clear, glass containers; however, it is to be understood that said label is not limited in its utility to decorating silane-treated, clear, glass containers and may be used to decorate other types of articles including, but not limited to, silane-treated or polyethylene-coated, frosted glass containers, as well as non-glass articles. (For purposes of the present specification and claims, the term “silane-treated glass containers” is intended to encompass glass containers that have been pre-treated, prior to silane-treatment, with oleic acid or stearate (regardless of whether said pre-treatment is thereafter removed prior to silane-treatment) and those that have not been pre-treated prior to silane-treatment.)

In addition to being directed to the above-described heat-transfer label, the present invention is also directed to a transfer portion of a heat-transfer label comprising an ink layer, said ink layer including a design printed with a frosted ink, and an adhesive layer positioned over said ink design layer. In addition, the present invention is directed to a frosted ink formulation and to a method of decorating an article, such as a silane-treated clear glass container, with a heat-transfer label comprising a design printed with a frosted ink. Furthermore, the present invention is directed to a method of decorating an article comprising the steps of providing a printed design made using a frosted ink, said frosted ink comprising a phenoxy resin, a silica and a colorant and applying said printed design to the article. Additionally, the present invention is directed to a method of decorating a clear article comprising the steps of printing a design using a frosted ink and affixing said design to the clear article.

For purposes of the present specification and claims, it is to be understood that certain terms used herein, such as “on” or “over,” when used to denote the relative positions of two or more layers of a heat-transfer label, are primarily used to denote such relative positions in the context of how those layers are situated prior to transfer of the transfer portion of the label to an article since, after transfer, the arrangement of layers is inverted as those layers which were furthest removed from the associated support sheet are now closest to the labelled article.

Additional objects, as well as features, advantages and aspects of the present invention, will be set forth in part in the description which follows, and in part will be obvious from the description or may be learned by practice of the invention. In the description, reference is made to the accompanying drawings which form a part thereof and in which is shown by way of illustration specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate preferred embodiments of the invention and, together with the description, serve to explain the principles of the invention. In the drawings wherein like reference numerals represent like parts:

FIG. 1 is a schematic section view of a heat-transfer label constructed according to the teachings of the present invention, said heat-transfer label being adapted for use in, for example, decorating clear glass articles in such a way as to give such articles the appearance of having been frosted; and FIG. 2 is a front view of a clear glass container that has been decorated with a heat-transfer label of the type shown in FIG. 1, said decorated container having the appearance of having been frosted in those areas in which the label contains printed matter.

DETAILED DESCRIPTION OF PREFERRED EMBODIMENTS

Referring now to FIG. 1, there is shown a schematic section view of a heat-transfer label adapted for use in, for example, decorating clear glass articles in such a way as to give such articles the appearance of having been frosted, the heat-transfer label being constructed according to the teachings of the present invention and being represented generally by reference numeral 11.

Label 11 comprises a support portion 13. Support portion 13, in turn, comprises a carrier web 15 overcoated with a layer 17 preferably of polyethylene. Carrier web 15 is typically made of paper or a similarly suitable substrate. Details of polyethylene layer 17 are disclosed in U.S. Pat. Nos. 4,935,300 and 4,927,709, the disclosures of which, as noted above, are incorporated herein by reference.

Label 11 also comprises a skim coat 19 of the type described above, said skim coat being coated directly on top of the entirety of polyethylene layer 17. During label transfer, a portion of skim coat 19 is typically transferred along with the transfer portion of label 11 onto the article being decorated, and a portion of skim coat 19 remains on top of polyethylene layer 17.

Label 11 further comprises a transfer portion 21. Transfer portion 21, in turn, includes (i) a protective lacquer layer 23 printed directly on top of a portion of skim coat 19, (ii) an ink design layer 25 printed onto a desired area of lacquer layer 23, and (iii) a heat-activatable adhesive layer 27 printed onto design layer 25, any exposed portions of lacquer layer 23 and a surrounding portion of skim coat 19.

Protective lacquer layer 23 preferably comprises a cross-linked phenoxy lacquer resin such as is disclosed in U.S. patent application Ser. No. 09/093,150, which is incorporated herein by reference; however, it is to be understood that other types of lacquer resins may also be suitable for use in layer 23 depending upon the use to which the decorated article is to be put. Examples of phenoxy lacquer resins suitable for use in the aforementioned cross-linked phenoxy resin include the UCAR® Phenoxy Resins (Phenoxy Associates, Rock Hill, S.C.), which have the following chemical structure:

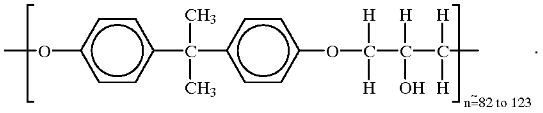

A particularly preferred UCAR® Phenoxy Resin is PKHH, a medium weight grade of the above structure which, at 40% solids, by weight, in methyl ethyl ketone (MEK), has a solution viscosity of 4500 to 7000 mPa●s(cP). Examples of a suitable cross-linker for cross-linking the aforementioned phenoxy resin include partially methylated melamine-formaldehyde resins of the type present in the CYMEL 300 series of partially methylated melamine-formaldehyde resin solutions (Cytec, Industries, Inc., West Paterson, N.J.) and, in particular, CYMEL 370 partially methylated melamine-formaldehyde resin solution (88±2% nonvolatiles, iBuOH solvent). Preferably, the solids of the aforementioned CYMEL 370 resin solution constitute no more than about 5%, by weight, of lacquer layer 23 (with the remainder of lacquer layer 23 being the aforementioned phenoxy resin) since the present inventors have discovered that amounts of CYMEL 370 in excess thereof tend to cause lacquer layer 23 to adhere undesirably to support portion 13 during label transfer.

One advantage to using a cross-linker of the aforementioned melamine-formaldehyde type, as opposed to other types of cross-linkers, is that said cross-linker does not require the use of a catalyst, but rather, is heat-activatable and that the heat-activation thereof can be achieved during the routine "post-curing" step (i.e., a heating of the decorated container at about 420° F. for about 20 minutes) to which the decorated container would ordinarily be subjected anyway following label transfer. It should be noted, however, that the present invention is not limited to such heat-activatable cross-linkers.

To form lacquer layer 23, a lacquer composition comprising the above-identified phenoxy lacquer resin, a suitable cross-linker and one or more suitable volatile solvents are deposited onto a desired area of skim coat 19, preferably by gravure printing or a similar technique. After deposition of the lacquer composition onto the desired area of skim coat 19, the volatile solvent(s) evaporate(s), leaving only the non-volatile components thereof to make up lacquer layer 23. In a preferred embodiment, the lacquer composition comprises about 20%, by weight, PKHH; about 1%, by weight, CYMEL 370 resin solution; about 59%, by weight, methyl ethyl ketone; and about 20%, by weight, toluene.

Ink design layer 25 of transfer portion 21 includes one or more design elements printed using a frosted ink and may additionally include one or more design elements printed using a non-frosted ink, an example of which is disclosed in U.S. Ser. No. 08/673,098, which is incorporated herein by reference. (For purposes of the present specification and claims, a "design element" may either be textual in nature, e.g., words, letters, numbers or the like, or non-textual in nature, e.g., drawings, images, etc.)

The frosted ink of the present invention preferably includes a phenoxy resin, a silica and a colorant. An illustrative example of a frosted ink suitable for use in printing the frosted design elements of ink design layer 25 is the following:

| Material | % by Weight |
|---|---|
| Non-volatile | 35 |
| PKHH phenoxy resin | 20 |
| SiLCRON G131 fine particle silica* | 7–10 |
| $TiO_2$ | 5–10 |
| Volatile | 65 |
| methyl ethyl ketone | 44 |
| toluene | 21 |

*an aerogel-type synthetic fine particle silica commercially available from Millennium Specialty Chemicals, Baltimore, MD and having a specific gravity of about 2.1, an average particle size of about 4.2 microns, a density of about 17.5 lbs./gal., a bulking value of about 5.7 gal./100 lbs., a dry bulk density of about 6.0 lbs./cubic foot in package, a loss on ignition (1000° C.) of about 6.0%, a pH (5% slurry) of about 2.8, an oil absorption of about 220 lbs./100 lbs. and a surface area of about 300 $m^2/g$ Ink design layer 25 is formed in the conventional manner by depositing, by gravure printing or the like, the above-described ink composition(s) onto one or more desired areas of lacquer layer 23 and, thereafter, allowing the volatile solvent component(s) of the ink solvent system(s) to evaporate, thereby leaving only the non-volatile ink components to form layer 25.

Adhesive layer 27 of transfer portion 21 preferably comprises a phenoxy adhesive resin of the type present in a water-based phenoxy dispersion; however, it is to be understood that other types of lacquer resins may also be suitable for use in layer 23 depending upon the use to which the decorated article is to be put. Adhesive layer 27 is preferably formed by depositing, by gravure printing or the like, onto ink layer 25, exposed portions of lacquer layer 23 and a surrounding area of skim coat 19 an adhesive composition preferably comprising a water-based phenoxy dispersion, an alcohol and water. (The adhesive composition may also include a crosslinker although the inclusion of such a crosslinker is not essential, particularly where protective lacquer layer 23 includes a crosslinker.) After deposition of the adhesive composition onto the underlying layers of label 11, the volatile components of the composition (e.g., water, alcohol) evaporate, leaving only the non-volatile solid components thereof to form layer 27.

A preferred example of the water-based phenoxy dispersion is PAPHEN® PKHW-34 (InChem Corp., South Carolina), an anionically-stabilized aqueous colloidal dispersion of a solid grade phenoxy resin, said dispersion having a solids content of about 34%, by weight, a pH of about 7.2, a Brookfield viscosity at 25° C. of about 1100 cP, a weight per gallon of about 8.80 pounds, an average particle size of about 0.09 micron, a flash point (PMCC) of about 141° F. and a freeze point of about −4° C. PAPHEN® PKHW-34 provides both hydroxyl groups and carboxyl groups for subsequent cross-linking at elevated temperatures.

In a preferred embodiment, the adhesive composition comprises about 66.5%, by weight, of PAPHEN® PKHW dispersion; about 16.75%, by weight, of isopropyl alcohol; and about 16.75%, by weight, water. Preferably, the water-borne phenoxy dispersion is stirred slowly while the combination of isopropyl alcohol and water are added thereto. A trace amount of a UV dye may be also be included in the composition to facilitate registration of the layer during printing.

Label 11 may be used in the conventional manner by contacting adhesive layer 27 to a desired article, such as a silane-treated clear glass container, while applying sufficient heat to the bottom of carrier web 15 so as to cause transfer portion 21 (and, likely, a portion of skim coat 19) to be released from support portion 13 and so as to cause adhesive layer 27 to become heat-activated for bonding to the desired article. Post-curing and any other conventional processing steps would be performed in the usual manner.

The present inventors have noted that, when label 11 is used to decorate silane-treated, clear glass containers, a good degree of label adherence and scuff resistance is achieved.

Referring now to FIG. 2, there is shown a front view of a clear glass container C that has been decorated with a transfer portion 21 of a heat-transfer label of the type hereinbefore described as label 11. As can be seen, said decorated container C has the appearance of having been frosted in those areas 101 in which transfer portion 21 contains printed matter printed with the frosted ink. However, because container C is made to appear frosted using label 11 and not by the conventional chemical or mechanical means, container C does not suffer from a weakened structure typically resultant from conventional frosting techniques.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. A heat-transfer label comprising:

(a) a support portion; and (b) a transfer portion over said support portion for transfer of the transfer portion from the support portion to an article upon application of heat to the support portion while the transfer portion is placed into contact with the article, said transfer portion comprising (i) an ink layer, said ink layer including a design printed with a frosted ink comprising a phenoxy resin and a silica; and (ii) an adhesive layer over said ink layer.

2. The heat-transfer label as claimed in claim 1 wherein said transfer portion further comprises a protective lacquer layer, said ink layer being positioned over said protective lacquer layer.

3. The heat-transfer label as claimed in claim 2 further comprising a waxlike skim coat, said waxlike skim coat being interposed between said support portion and said transfer portion.

4. The heat-transfer label as claimed in claim 1 wherein said frosted ink further comprises a colorant.

5. The heat-transfer label as claimed in claim 4 wherein said colorant is titanium dioxide.

6. The heat-transfer label as claimed in claim 1 wherein said phenoxy resin is a solvent-soluble phenoxy resin having the following chemical structure:

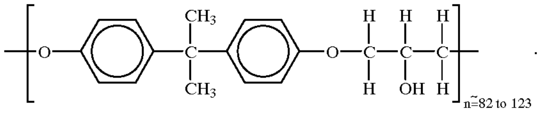

7. The heat-transfer label as claimed in claim 6 wherein said solvent-soluble phenoxy resin has a solution viscosity of 4500 to 7000 mPa●s(cP) at 40% solids, by weight, in methyl ethyl ketone.

8. The heat-transfer label as claimed in claim 1 wherein said silica is an aerogel-type synthetic fine particle silica having an average particle size of about 4.2 microns.

9. The heat-transfer label as claimed in claim 1 wherein said frosted ink comprises about 20%, by weight, of a phenoxy resin having the following chemical structure:

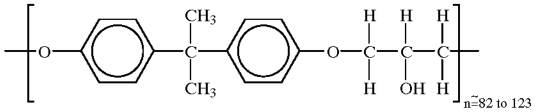

about 7–10%, by weight, of an aerogel-type synthetic fine particle silica having an average particle size of about 4.2 microns and about 5–10%, by weight, of titanium oxide for a total non-volatile solids content of about 35%, the remainder of said frosted ink constituting a 2:1 mixture of methyl ethyl ketone and toluene.

10. The heat-transfer label as claimed in claim 1 wherein said adhesive layer comprises a phenoxy resin of the type present in a waterborne phenoxy dispersion.

11. The heat-transfer label as claimed in claim 10 wherein said waterborne phenoxy dispersion is an anionically-stabilized aqueous colloidal dispersion of a solid grade phenoxy resin having both hydroxyl groups and carboxyl groups, said anionically-stabilized aqueous colloidal dispersion having a solids content of about 34%, by weight, a pH of about 7.2, a Brookfield viscosity at 25° C. of about 1100 cP, a weight per gallon of about 8.80 pounds, an average particle size of about 0.09 micron, a flash point (PMCC) of about 141° F. and a freeze point of about −4° C.

12. The heat-transfer label as claimed in claim 11 wherein said adhesive layer is made by depositing onto said ink layer a composition comprising about 66.5%, by weight, of said anionically-stabilized aqueous colloidal dispersion, about 16.75%, by weight, isopropyl alcohol and about 16.75%, by weight, water and then evaporating the volatile components thereof.

13. The heat-transfer label as claimed in claim 2 wherein said protective lacquer layer comprises a cross-linked phenoxy resin.

14. The heat-transfer label as claimed in claim 13 wherein said cross-linked phenoxy resin is made by cross-linking a solvent-soluble phenoxy resin having the following chemical structure:

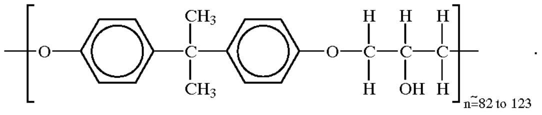

15. The heat-transfer label as claimed in claim 14 wherein said solvent-soluble phenoxy resin, prior to cross-linking, has a solution viscosity of 4500 to 7000 mPa●s(cP) at 40% solids, by weight, in methyl ethyl ketone.

16. The heat-transfer label as claimed in claim 15 wherein said solvent-soluble phenoxy resin is cross-linked using a melamine-formaldehyde resin.

17. The heat-transfer label as claimed in claim 16 wherein said melamine-formaldehyde resin is a partially methylated melamine-formaldehyde resin.

18. The heat-transfer label as claimed in claim 17 wherein said partially methylated melamine-formaldehyde resin constitutes no more than about 5%, by weight, of said protective lacquer layer.

* * * * *